United States Patent
Khoshnevisan et al.

(10) Patent No.: US 11,546,094 B2
(45) Date of Patent: Jan. 3, 2023

(54) DYNAMIC HYBRID AUTOMATIC REPEAT REQUEST (HARQ) CODEBOOK FOR MULTI-TRANSMIT RECEIVE POINT (TRP) COMMUNICATION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 17/249,043

(22) Filed: Feb. 18, 2021

(65) Prior Publication Data

US 2021/0250135 A1 Aug. 12, 2021

Related U.S. Application Data

(63) Continuation of application No. 16/948,500, filed on Sep. 21, 2020, now Pat. No. 10,931,408, which is a
(Continued)

(51) Int. Cl.
*H04L 1/18* (2006.01)
*H04W 24/08* (2009.01)
(Continued)

(52) U.S. Cl.
CPC .......... *H04L 1/1819* (2013.01); *H04L 5/0055* (2013.01); *H04W 24/08* (2013.01); *H04W 72/042* (2013.01)

(58) Field of Classification Search
CPC .... H04L 1/1819; H04L 5/0055; H04W 24/08; H04W 72/042
See application file for complete search history.

(56) References Cited

U.S. PATENT DOCUMENTS 10,797,832 B2 10/2020 Khoshnevisan et al.
10,931,408 B2 2/2021 Khoshnevisan et al.
(Continued)

OTHER PUBLICATIONS

ETSI TS 136 331, "LTE, Evolved Universal Terrestrial Radio Access (E-UTRA), Radio Resource Control (RRC), Protocol Specification (Release 8)", 3GPP TS 36.331, V8.5.0, Apr. 2009, 205 pages.
(Continued)

*Primary Examiner* — Mohammad S Anwar
(74) *Attorney, Agent, or Firm* — Harrity & Harrity, LLP/Qualcomm (57) ABSTRACT

This disclosure provides systems, methods and apparatus for wireless communication. In one aspect, a multi-transmit-receive point (TRP) approach for hybrid automatic repeat request (HARQ) acknowledgment (ACK) feedback using counter downlink assignment indicators (DAIs) (cDAIs) and total DAIs (tDAIs) is provided. For example, some techniques and apparatuses described herein may provide a joint counting method in which cDAIs and tDAIs are implemented and tracked jointly between the TRPs of a multi-TRP group. This may be useful in the ideal backhaul scenario when the multi-TRP group is jointly scheduled, and may be more robust against errors than a separate counting method. Some techniques and apparatuses described herein may provide a separate counting method, in which cDAIs and tDAIs are implemented and tracked separately by the respective TRPs of a multi-TRP group.

30 Claims, 5 Drawing Sheets

Related U.S. Application Data continuation of application No. 16/783,983, filed on Feb. 6, 2020, now Pat. No. 10,797,832.

(60) Provisional application No. 62/805,766, filed on Feb. 14, 2019.

(51) Int. Cl.
*H04W 72/04* (2009.01)
*H04L 5/00* (2006.01)

(56) References Cited

U.S. PATENT DOCUMENTS

| | | | |
|---|---|---|---|
| 2011/0075624 | A1 | 3/2011 | Papasakellariou et al. |
| 2012/0034927 | A1* | 2/2012 | Papasakellariou .. H04W 52/146 455/450 |
| 2013/0215807 | A1 | 8/2013 | Yang et al. |
| 2017/0373801 | A1 | 12/2017 | Bergstrom et al. |
| 2017/0374680 | A1 | 12/2017 | Chen et al. |
| 2018/0206224 | A1 | 7/2018 | Hwang et al. |
| 2019/0044666 | A1 | 2/2019 | Li |
| 2019/0045533 | A1 | 2/2019 | Chatterjee et al. |
| 2019/0306881 | A1* | 10/2019 | Fakoorian .............. H04W 76/27 |
| 2020/0059912 | A1* | 2/2020 | Shen ...................... H04L 1/0038 |
| 2020/0099475 | A1 | 3/2020 | Amuru et al. |
| 2020/0266937 | A1 | 8/2020 | Khoshnevisan et al. |
| 2021/0050955 | A1* | 2/2021 | Park ...................... H04L 1/1614 |

OTHER PUBLICATIONS

ETSI TS 138 213, "5G, NR, Physical Layer Procedures for Control (Release 15)", 3GPP TS 38.213, V15.3.0, Oct. 2018, 102 pages.

LG Electronics: "Simulation Results for Joint Coding and Separate Coding of HARQ-ACK and CSI on PUCCH Format 3", R1-122271, 3GPP TSG RAN WG1 Meeting #69, Prague, Czech Republic, May 21-25, 2012, 5 pages.

"Multiple Transmission and Reception Architecture in 5G", Ofinno, Retrieved on Mar. 2, 2021, 9 pages, https://ofinno.com/article/multiple-transmission-reception-architecture-5g/.

International Search Report and Written Opinion—PCT/US2020/017295—ISA/EPO—dated Jun. 12, 2020.

Nokia., et al., "Remaining Aspects of NR CA". 3GPP Draft, 3GPP TSG RAN WG1 Meeting #92, R1-1802540_CA, 3rd Generation Partnership Project (3GPP). Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018 (Feb. 16, 2018), XP051397476, 8 Pages, Retrieved from the Internet: URL: http://www.3gpp.org/ftp/tsg%5Fran/WG1%5FRL1/TSGR1%5F92/Docs/[retrieved on Feb. 16, 2018] Sections 3.1-3.4.

Samsung: "HARQ Management and Feedback," 3GPP Draft, 3GPP TSG RAN WG1 Meeting NR#3, R1-1716005, 3rd Generation Partnership Project (3GPP), Mobile Competence Centre, 650, Route Des Lucioles, F-06921, Sophia-Antipolis Cedex, France, vol. RAN WG1, No. Nagoya, Japan; Sep. 18, 2017-Sep. 21, 2017, Sep. 17, 2017, XP051339464, 10 pages, Retrieved from the Internet: URL: http://www.3gpp.org/ftp/Meetings_3GPP_SYNC/RAN1/Docs/ [retrieved on Sep. 17, 2017] p. 7,Figures 5, 6, Section 4.1.

VIVO: "Discussion on Multi PDCCH Based Multi TRP Transmission", 3GPP Draft, 3GPP TSG RAN WG1 Ad-Hoc Meeting 1901, R1-1900137_Discussion on Multi PDCCH Based Multi TRP Transmission_Final, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 12, 2019, XP051575761, Retrieved from the Internet: URL: http://www.3gpp.org/ftp/tsg%5Fran/WG1%5FRL1/TSGR1%5FAH/NR%5FAH%5F1901/Docs/R1%2D1900137%2Ezip [retrieved on Jan. 12, 2019], section 5, 15 pages.

Zte: "Enhancements on Multi-TRP/Panel Transmission", 3GPP Draft, R1-1900087, 3GPP TSG RAN WG1 Ad-Hoc Meeting 1901, Enhancements on Multi-TRP and Multi-Panel Transmission, 3rd Generation Partnership Project (3GPP). Mobile Competence Centre, 650, Route Des Lucioles, F-06921 Sophia-Antipolis vol. RAN WG1, No. Taipei, Jan. 21, 2019-Jan. 25, 2019, Jan. 20, 2019 (Jan. 20, 2019), XP051593013, pp. 1-16, Retrieved from the Internet: URL: http://www.3gpp.org/ftp/Meetings%5F3GPP%5FSYNC/RAN1/Docs/R1%2D1900087%2Ezip [retrieved on Jan. 20, 2019] Figures 2.1-5, 2.1-6, Section 2.1.2.

* cited by examiner

DYNAMIC HYBRID AUTOMATIC REPEAT REQUEST (HARQ) CODEBOOK FOR MULTI-TRANSMIT RECEIVE POINT (TRP) COMMUNICATION

CROSS-REFERENCE TO RELATED APPLICATIONS

This application is a continuation of U.S. patent application Ser. No. 16/948,500, filed on Sep. 21, 2020 (now U.S. Pat. No. 10,931,408), entitled "DYNAMIC HYBRID AUTOMATIC REPEAT REQUEST (HARQ) CODEBOOK FOR MULTI-TRANSMIT RECEIVE POINT (TRP) COMMUNICATION," which is a continuation of U.S. patent application Ser. No. 16/783,983, filed on Feb. 6, 2020 (now U.S. Pat. No. 10,797,832), entitled "DYNAMIC HYBRID AUTOMATIC REPEAT REQUEST (HARQ) CODEBOOK FOR MULTI-TRANSMIT RECEIVE POINT (TRP) COMMUNICATION," which claims priority to U.S. Provisional Patent Application No. 62/805,766, filed on Feb. 14, 2019, entitled "DYNAMIC HARQ CODEBOOK FOR MULTI-TRP COMMUNICATION," which are hereby expressly incorporated by reference herein.

TECHNICAL FIELD

Aspects of the present disclosure generally relate to wireless communication, and more particularly to techniques for a dynamic hybrid automatic repeat request (HARQ) codebook for multi-transmit receive point (TRP) communication.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (such as bandwidth, transmit power, or further examples). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or further examples.

The above multiple access technologies have been adopted in various telecommunication standards to provide a common protocol that enables different user equipment to communicate on a municipal, national, regional, and even global level. New Radio (NR), which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the DL, using CP-OFDM or SC-FDM (also known as discrete Fourier transform spread OFDM (DFT-s-OFDM)) on the UL, as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication, performed by a user equipment (UE). The method may include receiving at least one of: one or more first downlink control information (DCI) transmissions, or one or more second DCI transmissions, where the one or more first DCI transmissions are associated with a first transmit-receive point (TRP) and the one or more second DCI transmissions are associated with a second TRP, and where the one or more first DCI transmissions and the one or more second DCI transmissions are associated with a physical downlink control channel (PDCCH) monitoring occasion; determining one or more hybrid automatic repeat request acknowledge (HARQ-ACK) payloads, based at least in part on counter downlink assignment indicator (DAI) values and total DAI values of the one or more first DCI transmissions and the one or more second DCI transmissions; and transmitting HARQ-ACK feedback based at least in part on the one or more HARQ-ACK payloads.

In some implementations, the method can include determining whether a DCI transmission, associated with the first TRP or the second TRP, was not received based at least in part on the counter DAI values and the total DAI values, and the HARQ-ACK feedback may whether the DCI transmission was not received.

In some implementations, the method can include determining which TRP, of the first TRP and the second TRP, transmitted the DCI transmission based at least in part on an ordering of the first TRP and the second TRP, where the ordering is based at least in part on a control resource set identifier or a search space identifier of the DCI transmission.

In some implementations, the method can include determining which TRP, of the first TRP and the second TRP, transmitted the DCI transmission based at least in part on an order of the first TRP and the second TRP, where the order is based at least in part on an indication, in the DCI transmission, of which TRP transmitted the DCI transmission.

In some implementations, the counter DAI values indicate respective counter values of each DCI transmission transmitted by the first TRP and the second TRP on or before the PDCCH monitoring occasion. In some implementations, the total DAI values indicate a total number of DCI transmissions that have been collectively transmitted by the first TRP and the second TRP on or before the PDCCH monitoring occasion. In some implementations, the first TRP and the second TRP are associated with a single serving cell. In some implementations, the total DAI values apply across all serving cells and TRPs, of the first TRP and the second TRP, for the PDCCH monitoring occasion.

In some implementations, the one or more HARQ-ACK payloads includes a joint HARQ-ACK payload for the first TRP and the second TRP. In some implementations, the one or more HARQ-ACK payloads includes respective HARQ-ACK payloads for the first TRP and the second TRP. In some implementations, the HARQ-ACK feedback indicates that a DCI transmission was not received, and the HARQ-ACK feedback indicates which TRP transmitted the DCI transmission based at least in part on a fixed assumption of which TRP transmitted the DCI transmission. In some implementations, the HARQ-ACK feedback indicates that a DCI transmission was not received, and the HARQ-ACK feedback indicates which TRP transmitted the DCI transmission based at least in part on which TRP transmitted an adjacent DCI transmission before or after the DCI transmission.

In some implementations, the total DAI values include respective total DAI values for the first TRP and the second TRP, and the counter DAI values are maintained separately for the first TRP and the second TRP. In some implementations, when the UE is configured with a single serving cell, the total DAI values are not provided in the one or more first DCI transmissions and the one or more second DCI transmissions. In some implementations, the method can include determining which TRP, of the first TRP and the second TRP, transmitted a particular DCI transmission, of the one or more first DCI transmissions or the one or more second DCI transmissions, based at least in part on a TRP differentiation technique. In some implementations, the method can include determining which TRP, of the first TRP and the second TRP, transmitted a particular counter DAI value or a particular total DAI value based at least in part on a TRP differentiation technique. In some implementations, when the UE is configured with a single serving cell, the total DAI values are provided in the one or more first DCI transmissions and the one or more second DCI transmissions.

In some implementations, the method can include receiving information indicating whether the counter DAI values and the total DAI values are based at least in part on joint counting or separate counting for the first TRP and the second TRP. In some implementations, the information indicating whether the counter DAI values and the total DAI values are based at least in part on joint counting or separate counting further indicates whether the first TRP and the second TRP are associated with a joint scheduling configuration. In some implementations, the information indicating whether the counter DAI values and the total DAI values are based at least in part on joint counting or separate counting for the first TRP and the second TRP, including information indicating whether the HARQ-ACK feedback uses a joint HARQ-ACK payload or separate HARQ-ACK payloads for the first TRP and the second TRP. In some implementations, the method can include receiving information indicating whether the HARQ-ACK feedback uses a joint HARQ-ACK payload or separate HARQ-ACK payloads for the first TRP and the second TRP. In some implementations, the first TRP and the second TRP are differentiated based at least in part on respective control resource set identifiers of the first TRP and the second TRP.

Another innovative aspect of the subject matter described in this disclosure can be implemented in a UE for wireless communication. The UE may include memory and one or more processors operatively coupled to the memory. The memory and the one or more processors may be configured to obtain at least one of: one or more first DCI transmissions, or one or more second DCI transmissions, where the one or more first DCI transmissions are associated with a first TRP and the one or more second DCI transmissions are associated with a second TRP, and where the one or more first DCI transmissions and the one or more second DCI transmissions are associated with a PDCCH monitoring occasion; determine one or more HARQ-ACK payloads based at least in part on counter DAI values and total DAI values of the one or more first DCI transmissions and the one or more second DCI transmissions; and output HARQ-ACK feedback based at least in part on the one or more HARQ-ACK payloads. In some aspects, the UE may perform or implement any one or more of the aspects described in connection with the method, above or elsewhere herein.

Yet another innovative aspect of the subject matter described in this disclosure can be implemented in a non-transitory computer-readable medium storing one or more instructions for wireless communication. The one or more instructions, when executed by one or more processors of a UE, may cause the one or more processors to receive at least one of: one or more first DCI transmissions, or one or more second DCI transmissions, where the one or more first DCI transmissions are associated with a first TRP and the one or more second DCI transmissions are associated with a second TRP, and where the one or more first DCI transmissions and the one or more second DCI transmissions are associated with a PDCCH monitoring occasion; determine one or more HARQ-ACK payloads based at least in part on counter DAI values and total DAI values of the one or more first DCI transmissions and the one or more second DCI transmissions; and provide HARQ-ACK feedback based at least in part on the one or more HARQ-ACK payloads. In some aspects, the non-transitory computer-readable medium may implement any one or more of the aspects described in connection with the method, above or elsewhere herein.

Still another innovative aspect of the subject matter described in this disclosure can be implemented in an apparatus for wireless communication. The apparatus may include means for receiving at least one of: one or more first DCI transmissions, or one or more second DCI transmissions, where the one or more first DCI transmissions are associated with a first TRP and the one or more second DCI transmissions are associated with a second TRP, and where the one or more first DCI transmissions and the one or more second DCI transmissions are associated with a PDCCH monitoring occasion; means for determining one or more HARQ-ACK payloads based at least in part on counter DAI values and total DAI values of the one or more first DCI transmissions and the one or more second DCI transmissions; and means for transmitting HARQ-ACK feedback based at least in part on the one or more HARQ-ACK payloads. In some aspects, the apparatus may perform or implement any one or more of the aspects described in connection with the method, above or elsewhere herein.

Aspects generally include a method, apparatus, system, computer program product, non-transitory computer-readable medium, user equipment, base station, transmit-receive point, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular, or internet of things (IOT) network, such as a system utilizing 3G, 4G or 5G, or further implementations thereof, technology.

The hybrid automatic repeat request (HARQ) acknowledgment (ACK) system provides a mechanism for a UE to provide feedback indicating whether certain transmissions have been received by the UE. For example, the UE may provide HARQ feedback indicating an ACK value when a transmission has been received by the UE, and may provide HARQ feedback (also referred to as HARQ-ACK feedback) indicating a negative ACK (NACK) value when the transmission has not been received by the UE or was unsuccessfully received. The HARQ-ACK feedback can use a semi-static configuration, in which the UE uses a configured or predefined size for the HARQ feedback (or for a HARQ codebook used to generate the HARQ feedback), or a dynamic configuration, in which the UE determines the size of the HARQ feedback or the HARQ codebook. Some techniques and apparatuses described herein are related to the dynamic HARQ-ACK system, though the techniques and apparatuses described herein may be implemented using another type of HARQ-ACK system, such as a semi-static HARQ-ACK system.

In some cases, a UE may determine HARQ feedback using a HARQ codebook. For example, the UE may determine whether a set of transmissions were successfully received, may add ACKs or NACKs to the codebook in a particular order to indicate which transmissions of the set of transmissions were successfully received, and may generate HARQ feedback using the codebook.

As one example, the UE may determine whether downlink control information (DCI) and corresponding data transmissions are received successfully, and may provide HARQ feedback indicating which DCI and corresponding data transmissions were received successfully. In this case, the UE may determine a HARQ codebook based at least in part on physical downlink control channel (PDCCH) monitoring occasions of the DCI and downlink (DL) assignment indicators (DAIs) associated with the DCI.

For example, the PDCCH monitoring occasions may be based at least in part on configurations of different search space sets in different cells. The UE may use the union of PDCCH monitoring occasions across all active DL bandwidth parts (BWPs) of configured serving cells, ordered in ascending order of start time of the search space set associated with a PDCCH monitoring occasion. If two search space sets are associated with the same start time, the two search space sets may be counted as a single PDCCH monitoring occasion.

The UE may receive the DAIs in the DCI (such as in the downlink grant associated with the DCI). The DAIs may include counter DAIs (sometimes abbreviated as cDAIs) and total DAIs (sometimes abbreviated as tDAIs). A cDAI may indicate a cumulative number of serving cell and PDCCH monitoring occasion pairs in which DL DCIs have been sent by the base station, up to the current serving cell and current PDCCH monitoring occasion. A tDAI may be used when multiple serving cells are present, such as in carrier aggregation. The tDAI may indicate the total number of serving cell and PDCCH monitoring occasions in which DL DCIs have been transmitted by the base station, up to the current PDCCH monitoring occasion. Thus, the same tDAI monitoring value may be used for all DCIs in the same PDCCH monitoring occasion. This provides protection against missing a DCI corresponding to the last serving cell in a particular PDCCH monitoring occasion, since the tDAI would inform the UE that one more DCI is to be expected than has been received according to the cDAI. The cDAI and tDAI for a particular DCI is expressed herein as {cDAI, tDAI} or (cDAI, tDAI).

If no DL DCI is missed, then ACK/NACKs corresponding to the received PDSCHs may be placed in a codebook in the same order as the cDAI. If a DL DCI is missed, then a NACK may be placed in the codebook in the position corresponding to the cDAI of the missed DL DCI. The UE may determine whether a DL DCI is missed by comparing consecutive cDAI values (for example, cDAI values of 0, then 1, then 3 may indicate that a DCI with a cDAI value of 2 was missed) or by comparing tDAIs and cDAIs of all DCIs in a given PDCCH monitoring occasion. The UE may generate HARQ feedback based at least in part on the codebook, and may provide the HARQ feedback to a base station. Thus, a UE may identify DCI that has been missed and may generate HARQ feedback based at least in part on cDAIs and tDAIs.

Some wireless communication systems may use a multi-transmit receive point (TRP) transmission technique, where multiple TRPs (or multiple antenna panels, or multiple antenna sub-panels) transmit the same transmission or respective transmissions. In such a case, each TRP may provide a respective DCI to schedule a respective codeword or transmission from each TRP. It may be desirable to provide HARQ-ACK feedback for a multi-TRP deployment so that the TRPs (or a base station associated with the TRPs) can determine when a DCI has been unsuccessfully received. However, it may be challenging to perform HARQ-ACK feedback for multi-TRP communications. For example, different TRPs may be associated with different backhaul conditions, and there may be differences in the HARQ-ACK feedback process for a joint payload (for which HARQ-ACK feedback for the multi-TRP group is relevant to all TRPs of the multi-TRP group) in comparison to separate payloads (for which HARQ-ACK feedback for the multi-TRP group is provided using respective HARQ-ACK payloads for each TRP of the multi-TRP group).

Some techniques and apparatuses described herein provide a multi-TRP approach for HARQ-ACK feedback using cDAIs and tDAIs. For example, some techniques and apparatuses described herein may provide a joint counting method in which cDAIs and tDAIs are implemented and tracked jointly between the TRPs of a multi-TRP group. This may be useful in the ideal backhaul scenario when the multi-TRP group is jointly scheduled, and may be more robust against errors than a separate counting method. For example, the cDAI may indicate a cumulative number of serving cell, TRP and PDCCH monitoring occasion triples in which DL DCIs have been sent by the base station, up to the current serving cell, TRP and PDCCH monitoring occasion triple. A serving cell, TRP, and PDCCH monitoring occasion triple may refer to information that identifies a combination of a serving cell, a TRP, and a PDCCH monitoring occasion. For example, considering a set of serving cells 1 and 2, TRPs A and B, and PDCCH monitoring occasions X and Y, possible triples include [1 A X], [2 A X], [1 B X], [2 B X], [1 A Y], [2 A Y], [1 B Y], and [2 B Y], for a total of 8 triples. The tDAI may indicate the total number of such triples in which DL DCIs have been transmitted by the base station, up to the current PDCCH monitoring occasion. These triples may be arranged in any order. A more detailed description of the cDAI and tDAI counting approaches is provided in connection with FIG. 4. Some techniques and apparatuses described herein may provide a separate counting method, in which cDAIs and tDAIs are implemented and tracked separately by the respective TRPs of a multi-TRP group. This may be useful for both ideal and non-ideal backhaul scenarios.

Particular implementations of the subject matter described in this disclosure can be implemented to realize one or more of the following potential advantages. Some implementations of the subject matter may improve the throughput and reliability of wireless networks, particularly wireless networks using multi-TRP deployments. Furthermore, some implementations described herein may improve reliability of HARQ-ACK feedback and reduce inefficiency of multi-TRP downlink communications. Still further, some implementations described herein may provide HARQ-ACK feedback irrespective of whether a multi-TRP group is associated with an ideal backhaul or a non-ideal backhaul, thereby improving the versatility of multi-TRP groups and possibly relaxing implementation requirements for multi-TRP groups.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein a person one having ordinary skill in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or further examples (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G/NR and later.

Figure 1:
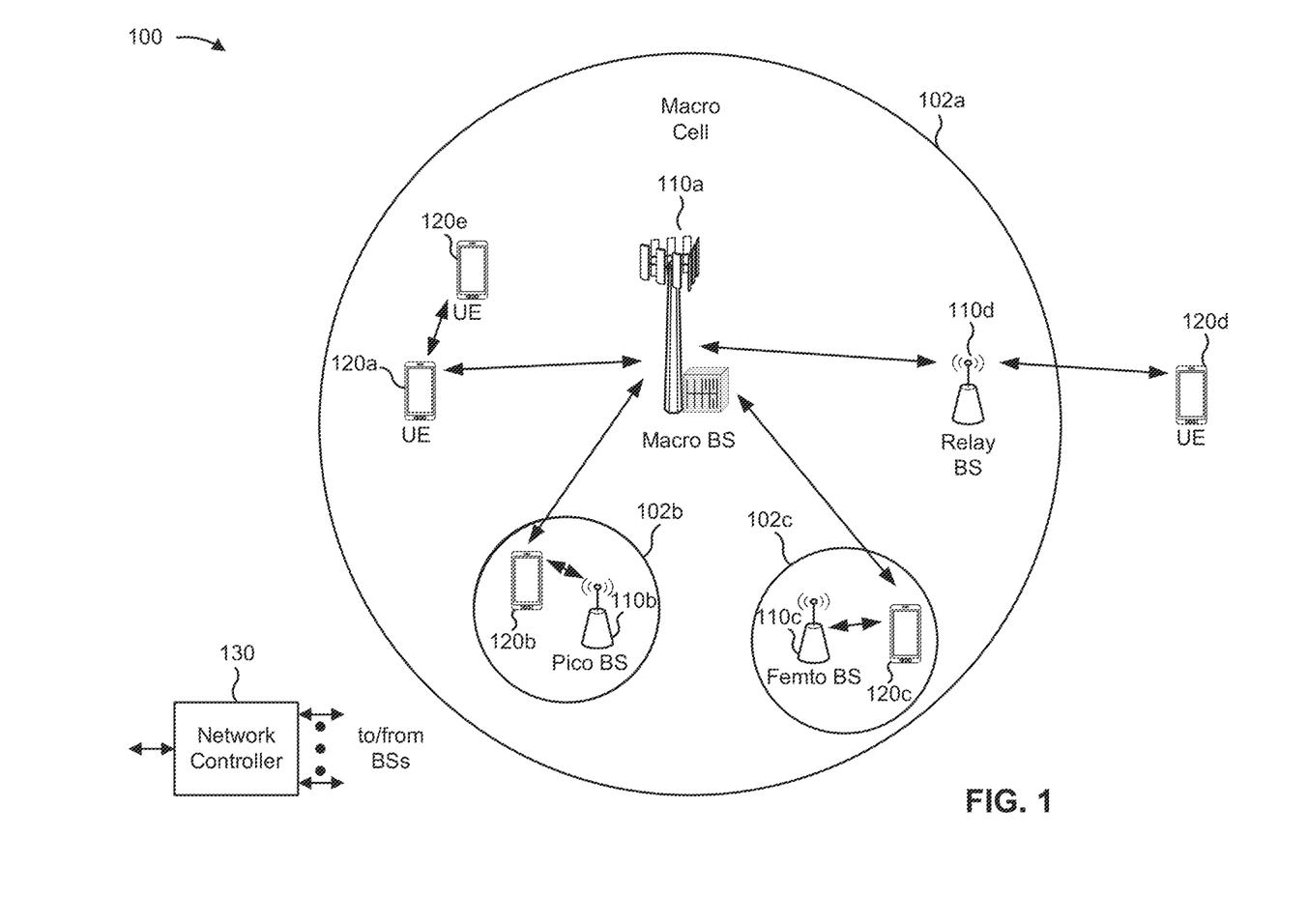
FIG. 1 is a block diagram conceptually illustrating an example of a wireless communication network.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or further examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (such as several kilometers in radius) and may allow unrestricted access by UEs with service subscription. A pico cell may cover a relatively small geographic area and may allow unrestricted access by UEs with service subscription. A femto cell may cover a relatively small geographic area (such as a home) and may allow restricted access by UEs having association with the femto cell (such as UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (such as three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or further examples using any suitable transport network.

Wireless network 100 also may include relay stations. A relay station is an entity that can receive a transmission of data from an upstream station (such as a BS or a UE) and send a transmission of the data to a downstream station (such as a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, or further examples.

Wireless network 100 may be a heterogeneous network that includes BSs of different types, such as macro BSs, pico BSs, femto BSs, relay BSs, or further examples. These different types of BSs may have different transmit power levels, different coverage areas, and different impacts on interference in wireless network 100. For example, macro BSs may have a high transmit power level (such as 5 to 40 Watts) whereas pico BSs, femto BSs, and relay BSs may have lower transmit power levels (such as 0.1 to 2 Watts).

A network controller 130 may couple to a set of BSs and may provide coordination and control for these BSs. Network controller 130 may communicate with the BSs via a backhaul. The BSs also may communicate with one another, such as directly or indirectly via a wireless or wireline backhaul.

UEs 120 (such as 120a, 120b, 120c) may be dispersed throughout wireless network 100, and each UE may be stationary or mobile. A UE also may be referred to as an access terminal, a terminal, a mobile station, a subscriber unit, a station, or further examples. A UE may be a cellular phone (such as a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (such as smart ring, smart bracelet)), an entertainment device (such as a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or further examples, that may communicate with a base station, another device (such as remote device), or some other entity. A wireless node may provide, for example, connectivity for or to a network (such as a wide area network, Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or further examples.

In general, any number of wireless networks may be deployed in a given geographic area. Each wireless network may support a particular RAT and may operate on one or more frequencies. A RAT also may be referred to as a radio technology, an air interface, or further examples. A frequency also may be referred to as a carrier, a frequency channel, or further examples. Each frequency may support a single RAT in a given geographic area in order to avoid interference between wireless networks of different RATs. In some cases, NR or 5G RAT networks may be deployed.

In some aspects, two or more UEs 120 (shown as UE 120a and UE 120e) may communicate directly using one or more sidelink channels (without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or further examples), a mesh network, or further examples. In this case, the UE 120 may perform scheduling operations, resource selection operations, or other operations described elsewhere herein as being performed by the base station 110.

As indicated above, FIG. 1 is provided as an example. Other examples may differ from what is described with regard to FIG. 1.

Figure 2:
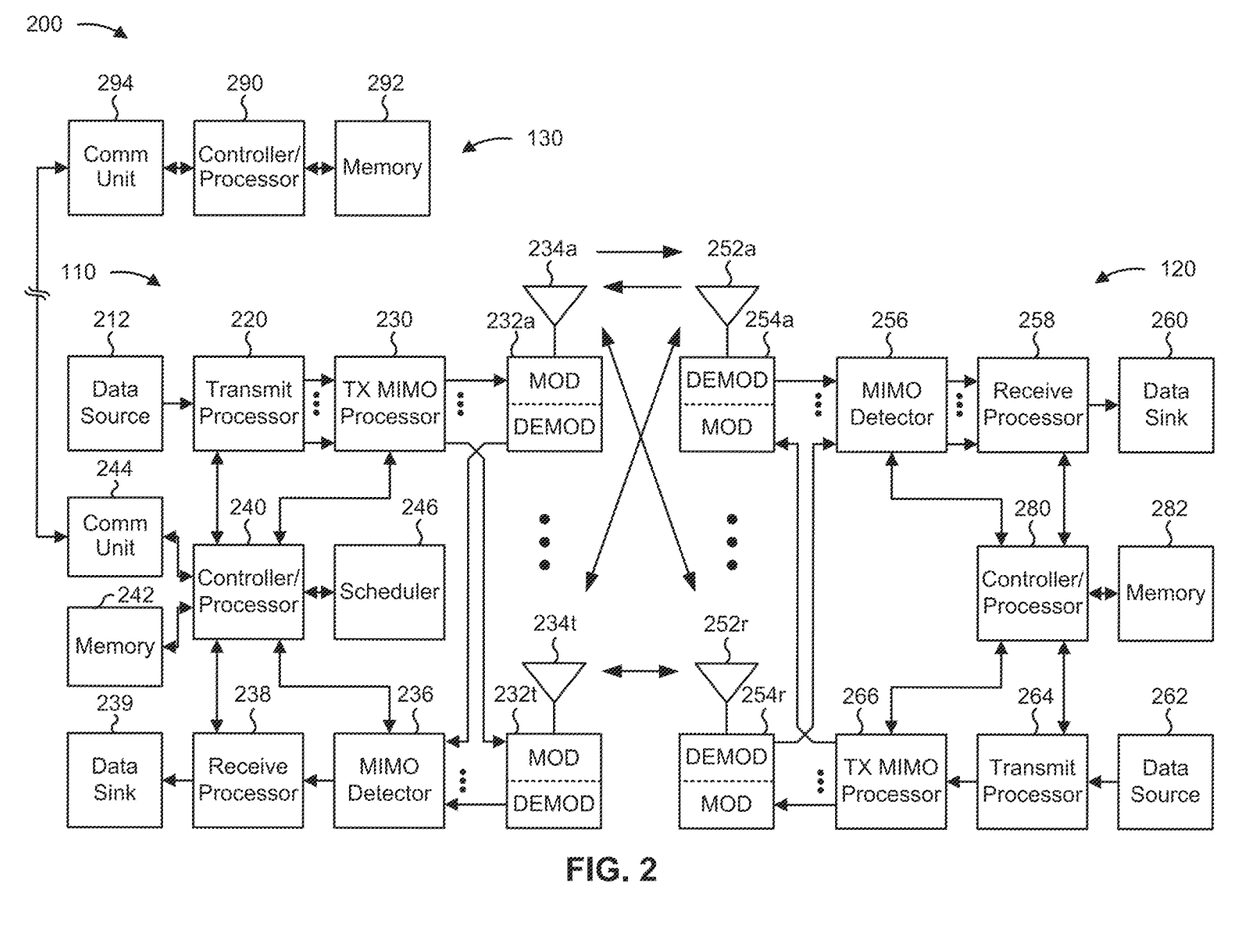
FIG. 2 is a block diagram conceptually illustrating an example of a base station in communication with a UE in a wireless communication network.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (such as encode and modulate) the data for each UE based at least in part on the MCS(s) selected for the UE, and provide data symbols for all UEs. Transmit processor 220 also may process system information (such as for semi-static resource partitioning information (SRPI) or further examples) and control information (such as CQI requests, grants, upper layer signaling, or further examples) and provide overhead symbols and control symbols. Transmit processor 220 also may generate reference symbols for reference signals (such as the cell-specific reference signal (CRS)) and synchronization signals (such as the primary synchronization signal (PSS) and secondary synchronization signal (SSS)). A transmit (TX)

multiple-input multiple-output (MIMO) processor 230 may perform spatial processing (such as precoding) on the data symbols, the control symbols, the overhead symbols, or the reference symbols, if applicable, and may provide T output symbol streams to T modulators (MODs) 232a through 232t. Each modulator 232 may process a respective output symbol stream (such as for OFDM or further examples) to obtain an output sample stream. Each modulator 232 may further process (such as convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DE-MODs) 254a through 254r, respectively. Each demodulator 254 may condition (such as filter, amplify, downconvert, and digitize) a received signal to obtain input samples. Each demodulator 254 may further process the input samples (such as for OFDM or further examples) to obtain received symbols. A MIMO detector 256 may obtain received symbols from all R demodulators 254a through 254r, perform MIMO detection on the received symbols if applicable, and provide detected symbols. A receive processor 258 may process (such as demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), or further examples. In some aspects, one or more components of UE 120 may be included in a housing.

On the uplink, at UE 120, a transmit processor 264 may receive and process data from a data source 262 and control information (such as for reports including RSRP, RSSI, RSRQ, CQI, or further examples) from controller/processor 280. Transmit processor 264 also may generate reference symbols for one or more reference signals. The symbols from transmit processor 264 may be precoded by a TX MIMO processor 266 if applicable, further processed by modulators 254a through 254r (such as for DFT-s-OFDM, CP-OFDM, or further examples), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some implementations, controller/processor 240 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

Controller/processor 240 of base station 110, controller/processor 280 of UE 120, or any other component(s) of FIG. 2 may perform one or more techniques associated with a dynamic hybrid automatic repeat request (HARQ) codebook for multi-transmit receive point (TRP) communication, as described in more detail elsewhere herein. For example, controller/processor 240 of base station 110, controller/processor 280 of UE 120, or any other component(s) of FIG. 2 may perform or direct operations of, for example, the process 500 of FIG. 5 or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving at least one of: one or more first downlink control information (DCI) transmissions, or one or more second DCI transmissions, where the one or more first DCI transmissions are associated with a first transmit-receive point (TRP) and the one or more second DCI transmissions are associated with a second TRP, and where the one or more first DCI transmissions and the one or more second DCI transmissions are associated with a physical downlink control channel (PDCCH) monitoring occasion; means for determining one or more hybrid automatic repeat request acknowledge (HARQ-ACK) payloads, based at least in part on counter downlink assignment indicator (DAI) values and total DAI values of the one or more first DCI transmissions and the one or more second DCI transmissions; means for transmitting HARQ-ACK feedback based at least in part on the one or more HARQ-ACK payloads; means for determining whether a DCI transmission, associated with the first TRP or the second TRP, was not received based at least in part on the counter DAI values and the total DAI values; means for determining which TRP, of the first TRP and the second TRP, transmitted a particular DCI transmission, of the one or more first DCI transmissions and the one or more second DCI transmissions, based at least in part on a TRP differentiation technique; means for determining which TRP, of the first TRP and the second TRP, transmitted a particular counter DAI value or a particular total DAI value based at least in part on a TRP differentiation technique; means for receiving information indicating whether the counter DAI values and the total DAI values are based at least in part on joint counting or separate counting for the first TRP and the second TRP; means for receiving information indicating whether the HARQ-ACK feedback uses a joint HARQ-ACK payload or separate HARQ-ACK payloads for the first TRP and the second TRP; or further examples. In some aspects, such means may include one or more components of UE 120 described in connection with FIG. 2.

Figure 3:
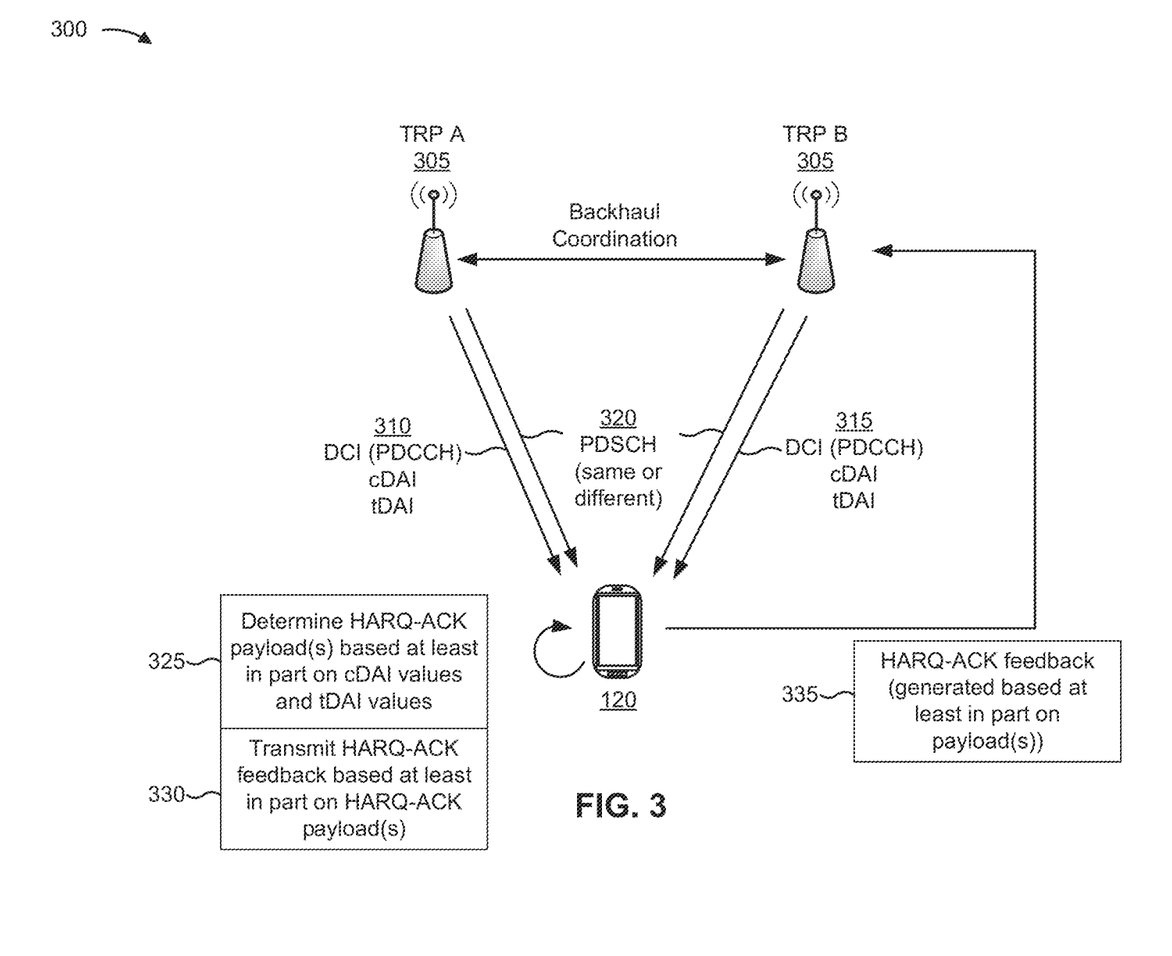
FIG. 3 is a diagram illustrating an example of dynamic hybrid automatic repeat request (HARQ)-acknowledgment (ACK) codebook usage for multi-transmit receive point (TRP) communication.

FIG. 3 is a diagram illustrating an example 300 of dynamic hybrid automatic repeat request (HARQ)-acknowledgment (ACK) codebook usage for multi-transmit receive point (TRP) communication.

As shown in FIG. 3, multiple TRPs 305 (shown as TRP A and TRP B) may communicate with the same UE 120 in a coordinated manner (such as using coordinated multipoint transmissions or further examples) to improve reliability, increase throughput, or further examples. The TRPs 305 may coordinate these communications via a backhaul, which may have a smaller delay or higher capacity when the TRPs 305 are co-located at the same base station 110 (such as different antenna arrays of the same base station 110) or may have a larger delay or lower capacity when the TRPs 305 are located at different base stations 110. In some cases, the backhaul may be an ideal backhaul, such as a backhaul associated with a threshold latency or a backhaul that permits joint scheduling of TRP A and TRP B. In some other cases, the backhaul may be a non-ideal backhaul, such as a backhaul with a latency that fails to satisfy a threshold or that does not permit joint scheduling.

TRP A and TRP B may be referred to herein as a multi-TRP group. As used herein, a multi-TRP group may refer to a set of TRPs that are to communicate with the same UE, a set of TRPs managed as a group by an access node controller, a set of TRPs that transmit the same physical downlink shared channel (PDSCH), a set of TRPs that transmit individual PDSCHs simultaneously or contemporaneously, or further examples.

A TRP also may be referred to as a BS, an NR BS, a Node B, a 5G NB, an AP, a gNB, or some other term, or may be used interchangeably with "cell." In some aspects, multiple TRPs may be included in a single BS 110 (such as using respective antenna panels or quasi-collocation relationships). In some aspects, different TRPs may be included in different BSs 110. A TRP may use one or more antenna ports. A set of TRPs (such as TRP A and TRP B) may be configured to individually (such as using dynamic selection) or jointly (such as using joint transmission) serve traffic to a UE 120. TRPs may be coordinated by or cooperative via an access node controller (ANC). In some aspects, no inter-TRP interface may be needed or present. A TRP may be associated with a higher-layer identifier, such as a control resource set (CORESET) identifier. For example, the CORESET identifier may include, be based at least in part on, or be mapped to a CORESET pool index.

As shown, a first physical downlink control channel (PDCCH) 310 may schedule communications for TRP A, and a second PDCCH 315 may schedule communications for TRP B. Here, as shown by reference number 320, the communications are PDSCHs, which may be common between TRP A and TRP B or may be different (such as different payload, different modulation and coding schemes, different transmit powers, or different repetition schemes). For example, in a first multi-TRP transmission mode (Mode 1), a single PDCCH may be used to schedule downlink data communications for a single PDSCH. In this case, multiple TRPs 305 (here, TRP A and TRP B) may transmit communications to the UE 120 on the same PDSCH. In some aspects, different TRPs 305 may transmit in different (such as disjoint) sets of resource blocks (RBs) or different sets of symbols. Additionally, or alternatively, different TRPs 305 may transmit using different layers (such as different multiple input multiple output (MIMO) layers). In some aspects, transmissions on different layers may occur in overlapping resource blocks or overlapping symbols. As another example, in a second multi-TRP transmission mode (Mode 2), multiple PDCCHs may be used to schedule downlink data communications for multiple corresponding PDSCHs (such as one PDCCH for each PDSCH).

As further shown, each PDCCH may be associated with a respective DCI, and each DCI may be associated with cDAI and tDAI values. In some aspects, the cDAI values and the tDAI values may be associated with a joint counting approach, in which TRP A and TRP B may coordinate via an ideal backhaul to determine cDAI values and tDAI values for a set of DCI. A description of joint counting for a multi-TRP group is provided in connection with FIG. 4, below. In some aspects, the cDAI values and the tDAI values may be associated with a separate counting approach, in which TRP A and TRP B each have respective cDAI and tDAI values. For example, the separate counting approach may treat each TRP as a respective physical uplink control channel (PUCCH) group by maintaining separate cDAI values and tDAI values for each TRP. In such a case, if there is only one serving cell for the UE 120, there may be no need to include the total DAI value in the DL DCI. Thus, the TRP may not include the total DAI value in the DL DCI, which may conserve resources of the TRP and the UE that would otherwise be used to track and process the total DAI value.

In some aspects, such as the case when the TRPs use separate counting, the UE 120 may use TRP differentiation to determine which downlink grant (and therefore, which cDAIs and tDAIs) belong to which TRP, and to determine which HARQ codebook might include an ACK/NACK for a particular DCI. TRP differentiation may be based at least in part on a configuration (such as using a control resource set identifier or a search space identifier of the downlink grant) or may be implicitly or explicitly indicated in the DCI (such as using an added bit, using an existing field, using a cyclic redundancy check mask, or further examples). Thus, the UE 120 may differentiate cDAIs and tDAIs of different TRPs without using a joint counting system, thereby conserving backhauling resources between the TRPs that would otherwise be used to implement the joint counting system.

In some aspects, the UE 120 may receive, from TRP A or B or from another device, an indication of whether joint counting or separate counting is to be used. For example, the indication may include radio resource control configuration information. In some aspects, this indication may be associated with or coupled with, or may be, an indication of whether a joint HARQ-ACK payload or separate HARQ-ACK payloads are to be used. Additionally, or alternatively, this indication may be associated with or coupled with an indication, to the UE 120, about whether TRP A and TRP B are associated with ideal or non-ideal backhaul conditions. For example, the indication of whether TRP A and TRP B are associated with ideal backhaul conditions or non-ideal backhaul conditions, or the indication of whether a joint HARQ-ACK payload or separate HARQ-ACK payloads are to be used, may implicitly indicate whether joint or separate counting is to be used (such as joint for ideal backhaul conditions and separate counting for non-ideal backhaul conditions).

As shown by reference number 325, the UE 120 may determine the one or more HARQ-ACK payloads (such as one or more codebooks) based at least in part on the cDAI values and the tDAI values. For example, the UE 120 may place ACKs or NACKs in locations of a joint codebook (when joint HARQ-ACK payloads are to be used) or separate codebooks (when separate HARQ-ACK payloads are to be used) corresponding to the DCIs received from TRP A and TRP B. As shown by reference number 330, the UE 120 may provide HARQ-ACK feedback (shown by reference number 335) to TRP A or TRP B. For example, the HARQ-ACK feedback may be generated based at least in part on the HARQ-ACK payload(s) or may include the HARQ-ACK payloads. In this way, the UE 120 may provide an indication of which DCIs (or which PDSCHs) are unsuccessfully received in a multi-TRP system using joint counting or separate counting.

Figure 4:
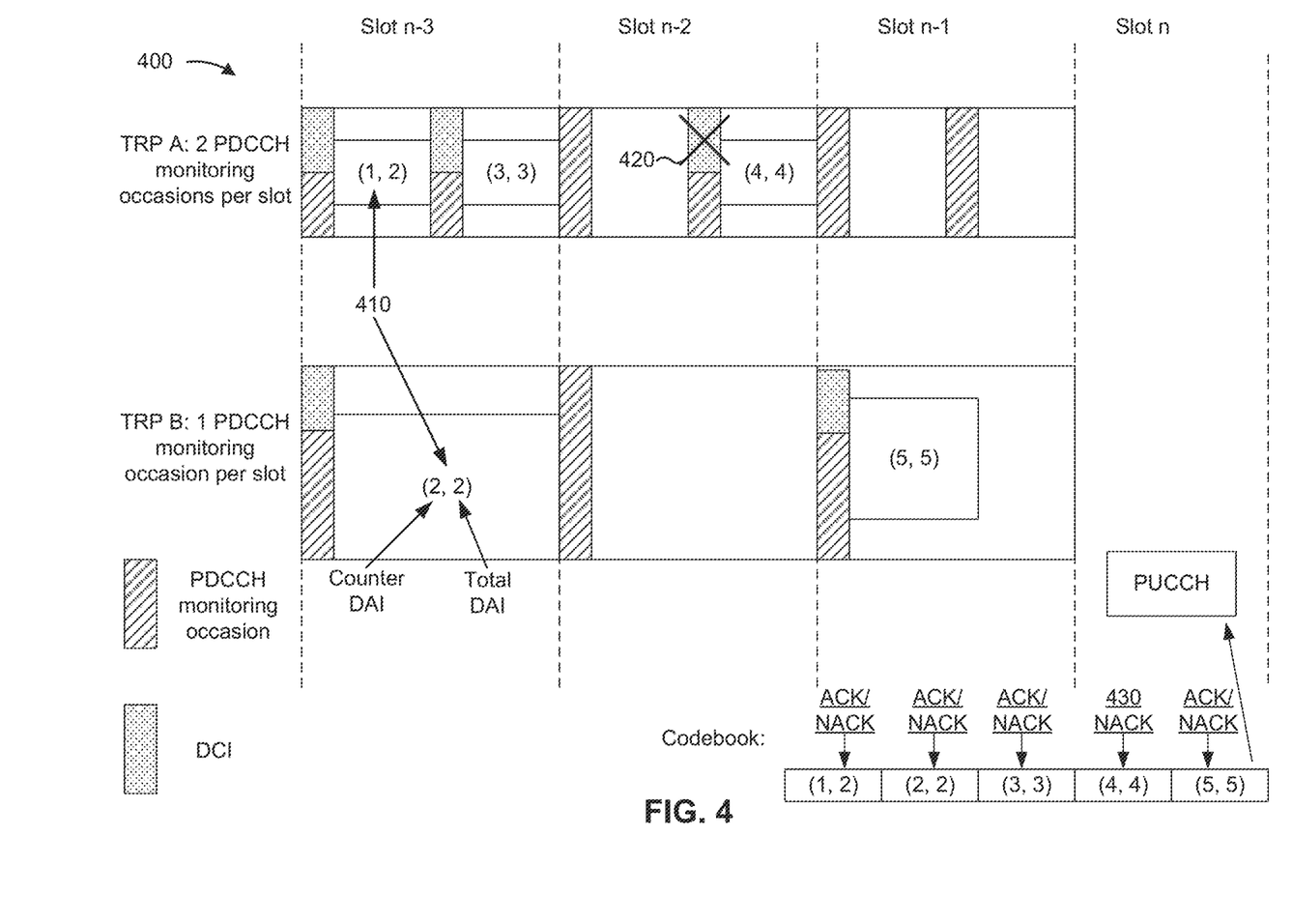
FIG. 4 is a diagram illustrating an example of HARQ-ACK feedback determination for multi-TRP communication using a joint total downlink assignment indicator approach.

FIG. 4 is a diagram illustrating an example 400 of HARQ-ACK feedback determination for multi-TRP communication using a joint tDAI approach. Example 400 includes a TRP A and a TRP B (such as TRPs 305). TRP A and TRP B may be associated with respective PDCCH monitoring occasions (shown here with diagonal hatching). For example, TRP A is associated with 2 PDCCH monitoring occasions per slot, and TRP B is associated with 1 PDCCH monitoring occasion per slot. A DCI received on a particular PDCCH monitoring occasion is shown with dotted hatching occupying part of the particular PDCCH monitoring occasion. Furthermore, various pairs of cDAI values and tDAI values are shown using the notation (cDAI, tDAI). These pairs of cDAI values and tDAI values may be received in the DCI, and are shown at the corresponding location of the physical uplink control channel (PUCCH) scheduled by the DCI.

As shown by reference number 410, a first cDAI/tDAI pair and a second cDAI/tDAI pair may be associated with the same tDAI value of 2 and respective cDAI values of 1 and 2. This may be because, as of the first PDCCH monitoring occasion (and since search spaces are to have the same start time to be considered a single PDCCH monitoring occasion), two total DCI are cumulatively transmitted by TRP A and TRP B. Furthermore, the DCI transmitted by TRP A is counted before the DCI transmitted by TRP B. This may be due to a counting order assigned to TRP A and TRP B for the purposes of determining cDAI and tDAI values. For example, the order may be based at least in part on a control resource set identifier, a search space identifier, a TRP differentiation value in the DCI, or further examples. The cDAI may be based at least in part on a cumulative number of instances in which downlink DCI has been transmitted by a gNB up to a current PDCCH monitoring occasion, TRP, and serving cell instance. The tDAI may be based at least in part on a total number of instances in which downlink DCI has been transmitted by a gNB up to the current PDCCH monitoring occasion. For example, the cumulative number of instances and the total number of instances may be determined based at least in part on an order, such as a serving cell first, TRP second, and PDCCH monitoring occasion third order.

As further shown, the UE 120 may successfully receive a first, second, and third DCI. The UE 120 may add an ACK or NACK value to a location in the codebook based at least in part on a result of decoding a PDSCH associated with a DCI corresponding to the location. For example, the UE 120 may add an ACK when the PDSCH is successfully decoded and may add a NACK when the PDSCH is not successfully decoded.

As shown by reference number 420, the UE 120 may fail to receive a fourth DCI, shown by the X over the fourth DCI. For example, the UE may determine that the UE 120 has failed to receive the fourth DCI based at least in part on receiving the fifth DCI. The UE 120 may determine that the UE 120 received DCI with a cDAI value of 3 and a cDAI value of 5, and did not receive DCI with a cDAI value of 4, thus indicating that the fourth DCI was missed.

Accordingly, and as shown by reference number 430, the UE 120 may add a NACK to the codebook shown at the bottom right of FIG. 4, in a location consistent with the DCI. This may indicate that the PDSCH corresponding to the fourth DCI was not received, since the UE 120 does not know the location of the PDSCH corresponding to the fourth DCI. The UE 120 may determine this location based at least in part on the joint counting, based at least in part on a TRP differentiation technique, or based at least in part on a rule. For example, the UE 120 may assume that an unreceived DCI is associated with a particular TRP, may assume that an unreceived DCI is associated with a TRP other than one for which a DCI was most recently received, may assume that an unreceived DCI is associated with a TRP other than one for which a DCI was received immediately after the unreceived DCI, or further examples. As further shown, the UE 120 may transmit a physical uplink control channel based at least in part on the codebook. In some aspects, the UE 120 may generate and transmit respective codebooks for TRP A and TRP B. Thus, the UE 120 may perform joint counting for multi-TRP communications.

In some aspects, one serving cell of UE 120 may be configured to receive single-TRP transmissions, while another serving cell of UE 120 may be configured to receive multi-TRP transmission. In this case, in the joint counting approach, the DCI may include the tDAI for the multi-TRP group even if there is a single serving cell. Thus, the same tDAI value may be used across all DCIs across all serving cells and TRPs in the same PDCCH monitoring occasions.

Figure 5:
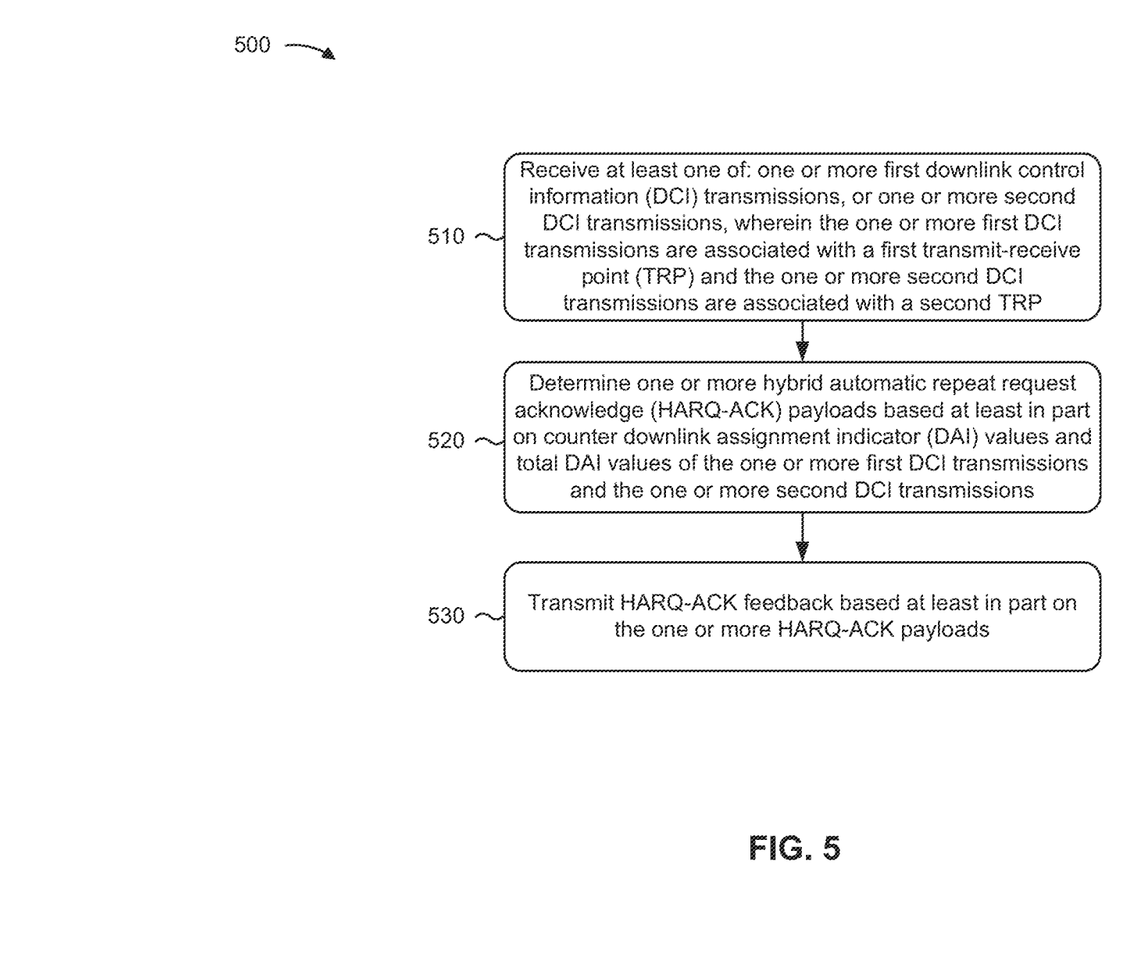
FIG. 5 is a diagram illustrating an example process performed, for example, by a user equipment.

FIG. 5 is a diagram illustrating an example process 500 performed, for example, by a UE. Example process 500 shows an example where a UE (such as UE 120) performs operations associated with a dynamic HARQ technique for multi-TRP communication.

As shown in FIG. 5, in some aspects, the process 500 may include receiving at least one of: one or more first downlink control information (DCI) transmissions, or one or more second DCI transmissions, where the one or more first DCI transmissions are associated with a first transmit-receive point (TRP) and the one or more second DCI transmissions are associated with a second TRP (block 510). For example, the UE (such as using antenna 252, DEMOD 254, MIMO detector 256, receive processor 258, controller/processor 280, or further examples) may receive at least one of one or more first DCI transmissions or one or more second DCI transmissions. In other words, the UE may successfully receive the one or more first DCI transmissions and the one or more second DCI transmissions, or may fail to receive one or more DCI transmissions of the one or more first DCI transmissions or the one or more second DCI transmissions. The one or more first DCI transmissions may be associated with a first TRP and the one or more second DCI transmissions may be associated with a second TRP. For example, the first TRP and the second TRP may be of a TRP group.

As shown in FIG. 5, in some aspects, the process 500 may include determining one or more hybrid automatic repeat request acknowledge (HARQ-ACK) payloads based at least in part on counter downlink assignment indicator (DAI) values and total DAI values of the one or more first DCI transmissions and the one or more second DCI transmissions (block 520). For example, the UE (such as using controller/processor 280 or further examples) may determine one or more HARQ-ACK payloads (such as one or more codebooks) based at least in part on cDAI values and tDAI values of the one or more first DCI transmissions and the one or more second DCI transmissions.

As shown in FIG. 5, in some aspects, the process 500 may include transmitting HARQ-ACK feedback based at least in part on the one or more HARQ-ACK payloads (block 530). For example, the UE (such as using controller/processor 280, transmit processor 264, TX MIMO processor 266, MOD 254, antenna 252, or further examples) may provide HARQ-ACK feedback based at least in part on the one or more HARQ-ACK payloads. In some aspects, the UE 120 may transmit the HARQ-ACK feedback to the first TRP or the second TRP.

Process 500 may include additional aspects, such as any single aspect or any combination of aspects described below or in connection with one or more other processes described elsewhere herein.

In a first aspect, the UE may determine whether a DCI transmission, associated with the first TRP or the second TRP, was not received based at least in part on the counter DAI values and the total DAI values. The HARQ-ACK feedback may identify whether the DCI transmission was not received. In a second aspect, alone or in combination with the first aspect, determining whether the DCI transmission was not received further includes determining which TRP, of the first TRP and the second TRP, transmitted the DCI transmission based at least in part on an ordering of the first TRP and the second TRP, and the ordering is based at least in part on a control resource set identifier or a search space identifier of the DCI transmission. In a third aspect, alone or in combination with one or more of the first and second aspects, determining whether the DCI transmission was not received further includes determining which TRP, of the first TRP and the second TRP, transmitted the DCI transmission based at least in part on an order of the first TRP and the second TRP. The order may be based at least in part on an indication, in the DCI transmission, of which TRP transmitted the DCI transmission.

In a fourth aspect, alone or in combination with one or more of the first through third aspects, the counter DAI values indicate respective counter values of each DCI transmission transmitted by the first TRP and the second TRP on or before the PDCCH monitoring occasion. In a fifth aspect, alone or in combination with one or more of the first through fourth aspects, the total DAI values indicate a total number of DCI transmissions that have been collectively transmitted by the first TRP and the second TRP on or before the PDCCH monitoring occasion. In a sixth aspect, alone or in combination with one or more of the first through fifth aspects, the first TRP and the second TRP are associated with a single serving cell. In a seventh aspect, alone or in combination with one or more of the first through sixth aspects, the total DAI values apply across all serving cells and TRPs, of the first TRP and the second TRP, for the PDCCH monitoring occasion. In an eighth aspect, alone or in combination with one or more of the first through seventh aspects, the one or more HARQ-ACK payloads include a joint HARQ-ACK payload for the first TRP and the second TRP. In a ninth aspect, alone or in combination with one or more of the first through eighth aspects, the one or more HARQ-ACK payloads include respective HARQ-ACK payloads for the first TRP and the second TRP.

In a tenth aspect, alone or in combination with one or more of the first through ninth aspects, the HARQ-ACK feedback indicates that a DCI transmission was not received, and the HARQ-ACK feedback indicates which TRP transmitted the DCI transmission based at least in part on a fixed assumption of which TRP transmitted the DCI transmission. In an eleventh aspect, alone or in combination with one or more of the first through tenth aspects, the HARQ-ACK feedback indicates that a DCI transmission was not received, and the HARQ-ACK feedback indicates which TRP transmitted the DCI transmission based at least in part on which TRP transmitted an adjacent DCI transmission before or after the DCI transmission. In a twelfth aspect, alone or in combination with one or more of the first through eleventh aspects, the total DAI values include respective total DAI values for the first TRP and the second TRP, and the counter DAI values are maintained separately for the first TRP and the second TRP. In a thirteenth aspect, alone or in combination with one or more of the first through twelfth aspects, when the first TRP is associated with a single serving cell, the total DAI values are not provided for the first TRP. In a fourteenth aspect, alone or in combination with one or more of the first through thirteenth aspects, the UE may determine which TRP, of the first TRP and the second TRP, transmitted a particular DCI transmission, of the one or more first DCI transmissions and the one or more second DCI transmissions, based at least in part on a TRP differentiation technique. In a fifteenth aspect, alone or in combination with one or more of the first through fourteenth aspects, the UE may determine which TRP, of the first TRP and the second TRP, transmitted a particular counter DAI value or a particular total DAI value based at least in part on a TRP differentiation technique.

In a sixteenth aspect, alone or in combination with one or more of the first through fifteenth aspects, when the first TRP is associated with a single serving cell, the total DAI values are provided for the first TRP. In a seventeenth aspect, alone or in combination with one or more of the first through sixteenth aspects, the UE may receive information indicating whether the counter DAI values and the total DAI values are based at least in part on joint counting or separate counting for the first TRP and the second TRP. In an eighteenth aspect, alone or in combination with one or more of the first through seventeenth aspects, the information indicating whether the counter DAI values and the total DAI values are based at least in part on joint counting or separate counting further indicates whether the first TRP and the second TRP are associated with a joint scheduling configuration. In a nineteenth aspect, alone or in combination with one or more of the first through eighteenth aspects, the information indicating whether the counter DAI values and the total DAI values are based at least in part on joint counting or separate counting for the first TRP and the second TRP includes information indicating whether the HARQ-ACK feedback uses a joint HARQ-ACK payload or separate HARQ-ACK payloads for the first TRP and the second TRP. In a twentieth aspect, alone or in combination with one or more of the first through nineteenth aspects, the UE may receive information indicating whether the HARQ-ACK feedback uses a joint HARQ-ACK payload or separate HARQ-ACK payloads for the first TRP and the second TRP. In a twenty-first aspect, alone or in combination with one or more of the first through twentieth aspects, the first TRP and the second TRP are differentiated based at least in part on respective control resource set identifiers of the first TRP and the second TRP.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. As used herein, a "processor" is implemented in hardware, firmware, or a combination of hardware and software.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. "Disk" and "disc," as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

The invention claimed is:

1. A method of wireless communication performed by a user equipment (UE), comprising:
   receiving radio resource control (RRC) configuration information comprising an indication of whether hybrid automatic repeat request acknowledge (HARQ-ACK) feedback uses a joint HARQ-ACK payload or separate HARQ-ACK payloads;

receiving one or more downlink control information (DCI) associated with a first control resource set (CORESET) identifier;

receiving one or more DCI associated with a second CORESET identifier;

wherein when the RRC configuration information indicates the HARQ-ACK feedback uses the joint HARQ-ACK payload, transmitting the joint HARQ-ACK payload based on a joint HARQ-ACK codebook used to generate HARQ-ACK feedback associated with the first CORESET identifier and the second CORESET identifier; and wherein when the RRC configuration information indicates the HARQ-ACK feedback uses the separate HARQ-ACK payloads, transmitting a first separate HARQ-ACK payload based on a separate HARQ-ACK codebook used to generate HARQ-ACK feedback associated with the first CORESET identifier and a second separate HARQ-ACK payload based on a separate HARQ-ACK codebook used to generate HARQ-ACK feedback associated with the second CORESET identifier.

2. The method of claim 1, wherein the one or more DCI associated with the first CORESET identifier includes a downlink assignment indicator (DAI) associated with the first CORESET identifier, and wherein the one or more DCI associated with the second CORESET identifier includes a DAI associated with the second CORESET identifier.

3. The method of claim 2, wherein at least one of the DAI associated with the first CORESET identifier or the DAI associated with the second CORESET identifier is associated with a physical downlink control channel (PDCCH) used to schedule physical downlink shared channel (PDSCH) communications.

4. The method of claim 3, wherein the HARQ-ACK feedback indicates which PDSCH communications are unsuccessfully received.

5. The method of claim 2, wherein at least one of the DAI associated with the first CORESET identifier or the DAI associated with the second CORESET identifier includes a counter downlink assignment indicator (cDAI).

6. The method of claim 2, wherein at least one of the DAI associated with the first CORESET or the DAI associated with the second CORESET identifier includes a total downlink assignment indicator (tDAI).

7. The method of claim 2, wherein the DAI associated with the first CORESET identifier and the DAI associated with the second CORESET identifier are tracked jointly when the RRC configuration information indicates the HARQ-ACK feedback uses the joint HARQ-ACK payload.

8. The method of claim 7, wherein the DAI associated with the first CORESET identifier and the DAI associated with the second CORESET identifier are counted in an order based on the first CORESET identifier and the second CORESET identifier.

9. The method of claim 2, wherein the DAI associated with the first CORESET identifier and the DAI associated with the second CORESET identifier are tracked separately when the RRC configuration information indicates the HARQ-ACK feedback uses the separate HARQ-ACK payloads.

10. A user equipment (UE) for wireless communication, comprising:
a memory; and
one or more processors coupled to the memory, the memory and the one or more processors configured to:

receive radio resource control (RRC) configuration information comprising an indication of whether hybrid automatic repeat request acknowledge (HARQ-ACK) feedback uses a joint HARQ-ACK payload or separate HARQ-ACK payloads;

receive one or more downlink control information (DCI) associated with a first control resource set (CORESET) identifier;

receive one or more DCI associated with a second CORESET identifier;

wherein when the RRC configuration information indicates the HARQ-ACK feedback uses the joint HARQ-ACK payload, transmit the joint HARQ-ACK payload based on a joint HARQ-ACK codebook used to generate HARQ-ACK feedback associated with the first CORESET identifier and the second CORESET identifier; and wherein when the RRC configuration information indicates the HARQ-ACK feedback uses the separate HARQ-ACK payloads, transmit a first separate HARQ-ACK payload based on a separate HARQ-ACK codebook used to generate HARQ-ACK feedback associated with the first CORESET identifier and a second separate HARQ-ACK payload based on a separate HARQ-ACK codebook used to generate HARQ-ACK feedback associated with the second CORESET identifier.

11. The UE of claim 10, wherein the one or more DCI associated with the first CORESET identifier includes a downlink assignment indicator (DAI) associated with the first CORESET identifier, and wherein the one or more DCI associated with the second CORESET identifier includes a DAI associated with the second CORESET identifier.

12. The UE of claim 11, wherein at least one of the DAI associated with the first CORESET identifier or the DAI associated with the second CORESET identifier is associated with a physical downlink control channel (PDCCH) used to schedule physical downlink shared channel (PDSCH) communications.

13. The UE of claim 12, wherein the HARQ-ACK feedback indicates which PDSCH communications are unsuccessfully received.

14. The UE of claim 11, wherein at least one of the DAI associated with the first CORESET identifier or the DAI associated with the second CORESET identifier includes a counter downlink assignment indicator (cDAI).

15. The UE of claim 11, wherein at least one of the DAI associated with the first CORESET or the DAI associated with the second CORESET identifier includes a total downlink assignment indicator (tDAI).

16. The UE of claim 11, wherein the DAI associated with the first CORESET identifier and the DAI associated with the second CORESET identifier are tracked jointly when the RRC configuration information indicates the HARQ-ACK feedback uses the joint HARQ-ACK payload.

17. The UE of claim 16, wherein the DAI associated with the first CORESET identifier and the DAI associated with the second CORESET identifier are counted in an order based on the first CORESET identifier and the second CORESET identifier.

18. The UE of claim 11, wherein the DAI associated with the first CORESET identifier and the DAI associated with the second CORESET identifier are tracked separately when the RRC configuration information indicates the HARQ-ACK feedback uses the separate HARQ-ACK payloads.

19. A non-transitory computer-readable medium storing one or more instructions for wireless communication, the one or more instructions comprising:
one or more instructions that, when executed by one or more processors of a user equipment (UE), cause the one or more processors to:
receive radio resource control (RRC) configuration information comprising an indication of whether hybrid automatic repeat request acknowledge (HARQ-ACK) feedback uses a joint HARQ-ACK payload or separate HARQ-ACK payloads;
receive one or more downlink control information (DCI) associated with a first control resource set (CORESET) identifier;
receive one or more DCI associated with a second CORESET identifier;
wherein when the RRC configuration information indicates the HARQ-ACK feedback uses the joint HARQ-ACK payload, transmit the joint HARQ-ACK payload based on a joint HARQ-ACK codebook used to generate HARQ-ACK feedback associated with the first CORESET identifier and the second CORESET identifier; and
wherein when the RRC configuration information indicates the HARQ-ACK feedback uses the separate HARQ-ACK payloads, transmit a first separate HARQ-ACK payload based on a separate HARQ-ACK codebook used to generate HARQ-ACK feedback associated with the first CORESET identifier and a second separate HARQ-ACK payload based on a separate HARQ-ACK codebook used to generate HARQ-ACK feedback associated with the second CORESET identifier.

20. The non-transitory computer-readable medium of claim 19, wherein the one or more DCI associated with the first CORESET identifier includes a downlink assignment indicator (DAI) associated with the first CORESET identifier, and
wherein the one or more DCI associated with the second CORESET identifier includes a DAI associated with the second CORESET identifier.

21. The non-transitory computer-readable medium of claim 20, wherein at least one of the DAI associated with the first CORESET identifier or the DAI associated with the second CORESET identifier is associated with a physical downlink control channel (PDCCH) used to schedule physical downlink shared channel (PDSCH) communications.

22. The non-transitory computer-readable medium of claim 21, wherein the HARQ-ACK feedback indicates which PDSCH communications are unsuccessfully received.

23. The non-transitory computer-readable medium of claim 20, wherein at least one of the DAI associated with the first CORESET identifier or the DAI associated with the second CORESET identifier includes a counter downlink assignment indicator (cDAI).

24. The non-transitory computer-readable medium of claim 20, wherein at least one of the DAI associated with the first CORESET or the DAI associated with the second CORESET identifier includes a total downlink assignment indicator (tDAI).

25. The non-transitory computer-readable medium of claim 20, wherein the DAI associated with the first CORESET identifier and the DAI associated with the second CORESET identifier are tracked jointly when the RRC configuration information indicates the HARQ-ACK feedback uses the joint HARQ-ACK payload.

26. The non-transitory computer-readable medium of claim 25, wherein the DAI associated with the first CORESET identifier and the DAI associated with the second CORESET identifier are counted in an order based on the first CORESET identifier and the second CORESET identifier.

27. The non-transitory computer-readable medium of claim 20, wherein the DAI associated with the first CORESET identifier and the DAI associated with the second CORESET identifier are tracked separately when the RRC configuration information indicates the HARQ-ACK feedback uses the separate HARQ-ACK payloads.

28. An apparatus for wireless communication, comprising:
means for receiving radio resource control (RRC) configuration information comprising an indication of whether hybrid automatic repeat request acknowledge (HARQ-ACK) feedback uses a joint HARQ-ACK payload or separate HARQ-ACK payloads;
means for receiving one or more downlink control information (DCI) associated with a first control resource set (CORESET) identifier;
means for receiving one or more DCI associated with a second CORESET identifier;
wherein when the RRC configuration information indicates the HARQ-ACK feedback uses the joint HARQ-ACK payload, means for transmitting the joint HARQ-ACK payload based on a joint HARQ-ACK codebook used to generate HARQ-ACK feedback associated with the first CORESET identifier and the second CORESET identifier; and
wherein when the RRC configuration information indicates the HARQ-ACK feedback uses the separate HARQ-ACK payloads, means for transmitting a first separate HARQ-ACK payload based on a separate HARQ-ACK codebook used to generate HARQ-ACK feedback associated with the first CORESET identifier and a second separate HARQ-ACK payload based on a separate HARQ-ACK codebook used to generate HARQ-ACK feedback associated with the second CORESET identifier.

29. The apparatus of claim 28, wherein the one or more DCI associated with the first CORESET identifier includes a downlink assignment indicator (DAI) associated with the first CORESET identifier, and
wherein the one or more DCI associated with the second CORESET identifier includes a DAI associated with the second CORESET identifier.

30. The apparatus of claim 29, wherein at least one of the DAI associated with the first CORESET identifier or the DAI associated with the second CORESET identifier is associated with a physical downlink control channel (PDCCH) used to schedule physical downlink shared channel (PDSCH) communications.

* * * * *